United States Patent
Sakamoto

(10) Patent No.: US 8,374,499 B2
(45) Date of Patent: Feb. 12, 2013

(54) IMAGING APPARATUS AND INTERCHANGEABLE LENS

(75) Inventor: Hiromichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/113,745

(22) Filed: May 23, 2011

(65) Prior Publication Data

US 2011/0299847 A1    Dec. 8, 2011

(30) Foreign Application Priority Data

Jun. 8, 2010  (JP) ................................ 2010-131249

(51) Int. Cl.
*G03B 17/00* (2006.01)

(52) U.S. Cl. ...................................... 396/532

(58) Field of Classification Search ............... 396/529, 396/532

See application file for complete search history.

(56) References Cited

U.S. PATENT DOCUMENTS 6,734,912 B1 * 5/2004 Kanayama et al. ........... 348/361
2011/0170853 A1 * 7/2011 Osawa ............................ 396/529

FOREIGN PATENT DOCUMENTS

JP        3658084 B2     6/2005
WO   WO 2009139118 A1 * 11/2009

* cited by examiner

*Primary Examiner* — Clayton E Laballe
*Assistant Examiner* — Noam Reisner
(74) *Attorney, Agent, or Firm* — Canon USA Inc. IP Division

(57) ABSTRACT

An imaging apparatus capable of mounting an interchangeable lens thereon includes first and second terminals for communicating with the interchangeable lens, and a control unit capable of switching between a first communication mode in which a clock signal is output from the first terminal and communication is performed using the second terminal based on the clock signal and a second communication mode in which communication is performed using the second terminal without outputting the clock signal from the first terminal. The control unit is configured to output a predetermined signal from the first terminal to the interchangeable lens when a predetermined condition is not satisfied in the second communication mode.

12 Claims, 9 Drawing Sheets

IMAGING APPARATUS AND INTERCHANGEABLE LENS

BACKGROUND OF THE INVENTION

1. Field of the Invention

The present invention relates to an imaging apparatus that exchanges information with an interchangeable lens by communication, and an interchangeable lens that can be mounted on the imaging apparatus.

2. Description of the Related Art

Conventionally, synchronous serial communication that uses a clock signal has been employed as a communication method between a camera, which serves as an imaging apparatus, and an interchangeable lens that can be mounted on the camera. Japanese Patent No. 3658084 discusses the following technical subject matter. First, synchronous serial communication is performed with an interchangeable lens at a first communication speed at which communication is possible even for an old type of interchangeable lens. Based on the communication contents, if a camera microcomputer determines that the mounted interchangeable lens is a new type of lens, the camera microcomputer switches to synchronous serial communication capable of communication at a faster second communication speed. Further, Japanese Patent No. 3658084 also discusses that, during this communication speed switch, the camera microcomputer switches the communication terminal circuits from an open drain type to a complementary metal-oxide-semiconductor (CMOS) type that is suited to high-speed communication. According to this technology, a system is realized in which, when an old type of interchangeable lens is used, operation is possible even though the speed is slow, while when a new type of interchangeable lens is used, the communication speed is improved to a constant high level.

However, for conventional synchronous serial communication, no matter how much the clock speed is increased, there is a wait between communications. Consequently, there is a limit to how much the operation performance, which includes communication between the camera and the interchangeable lens, can be improved.

SUMMARY OF THE INVENTION

The present invention is directed to a camera and an interchangeable lens that can further improve operational performance while also supporting old type interchangeable lenses.

According to an aspect of the present invention, an imaging apparatus capable of mounting an interchangeable lens thereon includes first and second terminals for communicating with the interchangeable lens, and a control unit capable of switching between a first communication mode in which a clock signal is output from the first terminal and communication is performed using the second terminal based on the clock signal and a second communication mode in which communication is performed using the second terminal without outputting the clock signal from the first terminal. The control unit is configured to output a predetermined signal from the first terminal to the interchangeable lens when a predetermined condition is not satisfied in the second communication mode.

According to another aspect of the present invention, an interchangeable lens mountable on an imaging apparatus includes first and second lens terminals for communicating with the imaging apparatus, and a lens control unit capable of switching between a first communication mode in which a clock signal is received from the first lens terminal and communication is performed using the second lens terminal based on the received clock signal and a second communication mode in which communication is performed using the second lens terminal without receiving the clock signal from the first lens terminal. The lens control unit is capable of detecting a predetermined signal sent from the imaging apparatus to the first lens terminal when a predetermined condition is not satisfied in the second communication mode.

According to yet another aspect of the present invention, an imaging system includes an imaging apparatus and an interchangeable lens mountable on the imaging apparatus. The imaging apparatus includes first and second terminals for communicating with the interchangeable lens. The imaging apparatus includes a control unit capable of switching between a first communication mode in which a clock signal is output from the first terminal and communication is performed using the second terminal based on the clock signal and a second communication mode in which communication is performed using the second terminal without outputting the clock signal from the first terminal. The control unit is configured to output a predetermined signal from the first terminal to the interchangeable lens when a predetermined condition is not satisfied in the second communication mode. The interchangeable lens includes first and second lens terminals for communicating with the imaging apparatus. The interchangeable lens includes a lens control unit capable of switching between a first communication mode in which a clock signal is received from the first lens terminal and communication is performed using the second lens terminal based on the received clock signal and a second communication mode in which communication is performed using the second lens terminal without receiving the clock signal from the first lens terminal. The lens control unit is capable of detecting a predetermined signal sent from the imaging apparatus to the first lens terminal when a predetermined condition is not satisfied in the second communication mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
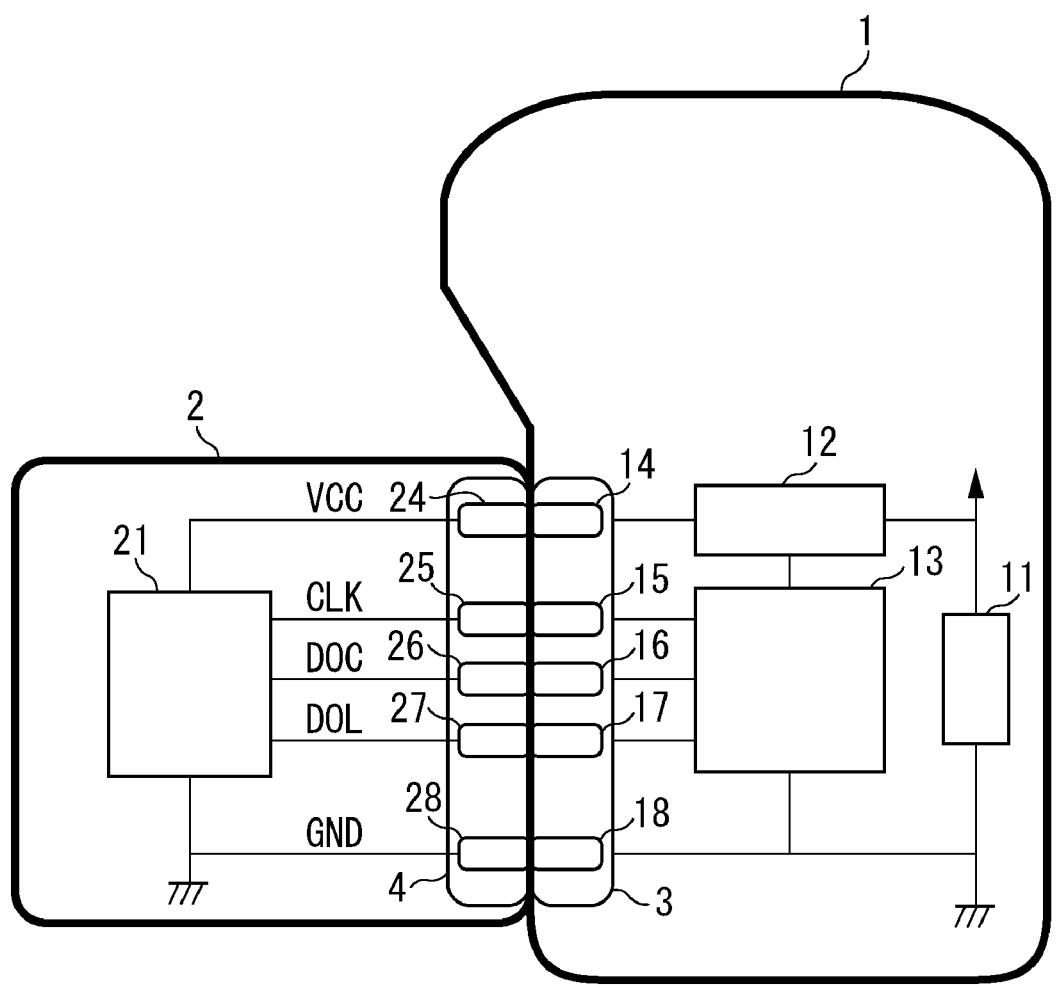
FIG. 1 illustrates a circuit configuration of a camera and an interchangeable lens according to an exemplary embodiment of the present invention.

FIG. 1 illustrates a circuit configuration of a camera and an interchangeable lens according to an exemplary embodiment of the present invention. In FIG. 1, an interchangeable lens 2 is detachably mountable on a camera 1. The camera 1 has a mount 3 and the interchangeable lens 2 has a lens mount 4. The camera 1 includes a battery 11, a power generation unit 12, and a camera microcomputer 13 as a control unit. The power generation unit 12 inputs a voltage output by the battery 11 to generate a power voltage that is optimally stabilized for an electric circuit of the camera microcomputer 13, for example, to operate. The power generation unit 12 supplies this power voltage to the respective electric circuits. Usually, the cameral also includes alight metering sensor for exposure control, a distance metering sensor for autofocus control, an image sensor for capturing a digital image, drive circuits for these units, an analog-to-digital (AD) conversion circuit, an image processing circuit, a liquid crystal monitor and a drive circuit thereof, a memory for recording digital images, and circuit structures such as a motor driver for mechanical driving. However, since these parts are not deeply related to the gist of the present invention, they are not illustrated.

A contact section formed from terminals 14 to 18 is provided on the mount 3 on the camera 1 side for exchanging electric signals with the interchangeable lens 2. The camera power terminal 14 is a terminal for supplying power for the lens generated by the power generation unit 12 to the interchangeable lens 2. The camera CLK terminal 15 is a terminal for transmitting a synchronous clock signal, for example, when the interchangeable lens 2 communicates with the camera 1. The camera DOC terminal 16 is a terminal for sending communication data from the camera 1 to the interchangeable lens 2. The camera DOL terminal 17 is a terminal for receiving communication data from the interchangeable lens 2 in the camera 1. The camera CLK terminal 15, acting as a first terminal, and the camera DOC terminal 16 and the camera DOL terminal 17, acting as a second terminal, are connected to the camera microcomputer 13. The camera GND terminal 18 is connected to the ground.

The interchangeable lens 2 includes a lens microcomputer 21. A contact section including terminals 24 to 28 is provided on the lens mount 4 on the lens 2 side for exchanging electric signals with the camera 1. The lens power terminal 24 is a terminal for receiving power supply from the camera 1. The lens CLK terminal 25 is a terminal for transmitting a synchronous clock signal, for example, when communicating with the camera 1. The lens DOC terminal 26 is a terminal for receiving communication data from the camera 1 to the interchangeable lens 2. The lens DOL terminal 27 is a terminal for sending communication data from the interchangeable lens 2 to the camera 1. The lens CLK terminal 25 acting as a first lens terminal and the lens DOC terminal 26 and the lens DOL terminal 27 acting as a second lens terminal are connected to the lens microcomputer 21. The lens GND terminal 28 is connected to the ground.

If the interchangeable lens 2 is normally mounted on the camera 1, the camera terminals 14 to 18 and the lens terminals 24 to 28 are connected to each other in the one-to-one relationship illustrated in FIG. 1.

The present invention can also be applied when performing wireless communication between the camera and the lens.

Further, in the present exemplary embodiment, although the camera terminals 14 to 18 are provided on the mount 3, the camera CLK terminal 15 can be provided somewhere other than the mount 3. Similarly, although the lens terminals 24 to 28 are provided on the lens mount 4, the lens CLK terminal 25 can be provided somewhere other than the lens mount 4.

Figure 2:
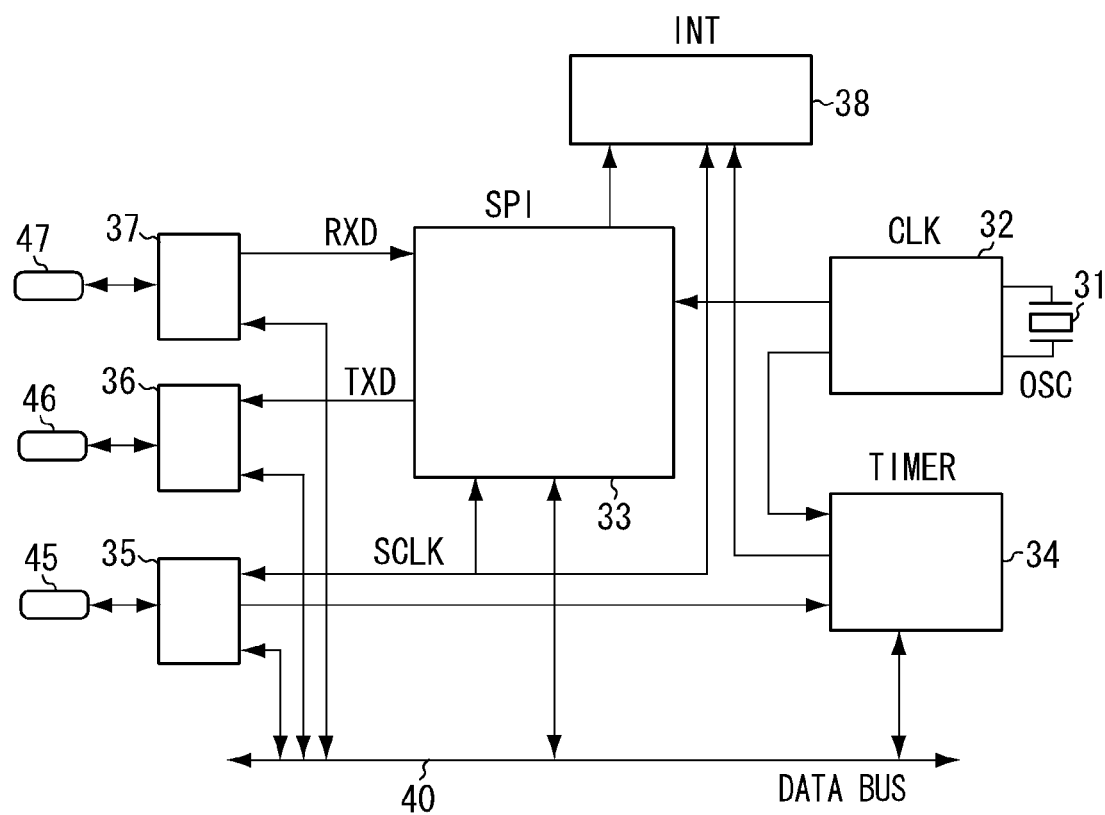
FIG. 2 is a circuit block diagram of a microcomputer.

FIG. 2 illustrates, among the circuit structures included in the camera microcomputer 13, a configuration relating to serial communication control.

As an oscillator 31, a crystal oscillator or a ceramic oscillator, for example, is used. The oscillator 31 is not limited to being included in the microcomputer, it may be externally attached. A clock generation circuit 32 is configured from, for example, a vibration source circuit that is connected to the oscillator 31 and generates a vibration source clock, a multiplier circuit that converts the vibration source clock to a higher frequency, and a clock generation circuit that divides and synthesizes the high-frequency clock generated by the multiplier circuit for generating clocks with various frequencies. The configuration of a communication control circuit 33 will now be described in more detail with reference to FIG. 3. A counter/timer circuit 34 can count the pulse number of an input signal, and measure the duration of the input signal. The clock signal generated by the clock generation circuit 32 is supplied to the communication control circuit 33 and the counter/timer circuit 34. Input/output (IO) control circuits 35 to 37 are circuits for switching the data input/output direction and the input/output signal type of an input/output signal of each of the camera input/output terminals 45 to 47, and for switching the input/output circuit mode. Switching the data input/output direction literally means switching between using a terminal for data input or for data output. Switching the input/output signal type refers to switching between connecting an input/output signal of a normal parallel IO signal to a terminal, or connecting a communication control circuit 33 input/output signal to a terminal. Switching the input/output circuit mode refers to switching between output based on the above open drain mode and output based on the CMOS mode, and whether to connect a pull-up resistor. The CLK signal IO control circuit 35 performs the input/output switching of the camera input/output terminal 45. The CLK signal IO control circuit 35 is connected to a synchronous clock signal SCLK via the communication control circuit 33, so that this synchronous clock signal SCLK can be supplied to the counter/timer circuit 34. The TXD signal IO control circuit 36 performs the input/output switching of the TXD signal terminal 46. The TXD signal IO control circuit 36 is connected to a serial communication data output signal TXD via the communication control circuit 33. The RXD signal IO control circuit 37 performs the input/output switching of the RXD signal terminal 47. The RXD signal IO control circuit 37 is connected to a serial communication data input signal RXD via the communication control circuit 33.

The interrupt control circuit 38 is configured so that an interrupt occurrence circuit is input thereto via the communication control circuit 33 and the counter/timer circuit 34. A data bus 40 in the microcomputer is connected to the communication control circuit 33, the counter/timer circuit 34, and the IO control circuits 35 to 37, whereby the data necessary for operation is delivered. Further, although the microcomputer includes circuit structures other than those illustrated in FIG. 2, such as an arithmetic logic unit (ALU), a program counter, a read-only memory (ROM), a random access memory (RAM) and an AD converter, these structures are not illustrated in the drawing.

The CLK signal terminal 45 is connected to the camera CLK terminal 15, the TXD signal terminal 46 is connected to the camera DOC terminal 16, and the RXD signal terminal 47 is connected to the camera DOL terminal 17.

The lens microcomputer 21 may have the same constituent elements as the camera microcomputer 13 for its configuration relating to serial communication control. Therefore, the configuration of the lens microcomputer 21 can be described based on FIG. 2 by substituting the respective constituent elements for the constituent elements on the lens side.

In the lens microcomputer 21, the CLK signal terminal 45 is connected to the lens CLK terminal 25, the TXD signal terminal 46 is connected to the lens DOC terminal 27, and the RXD signal terminal 47 is connected to the lens DOL terminal 26. This is because in the present exemplary embodiment, the DOC signal is data sent from the camera 1 to the interchangeable lens 2 and the DOL signal is data sent from the interchangeable lens 2 to the camera 1.

Figure 3:
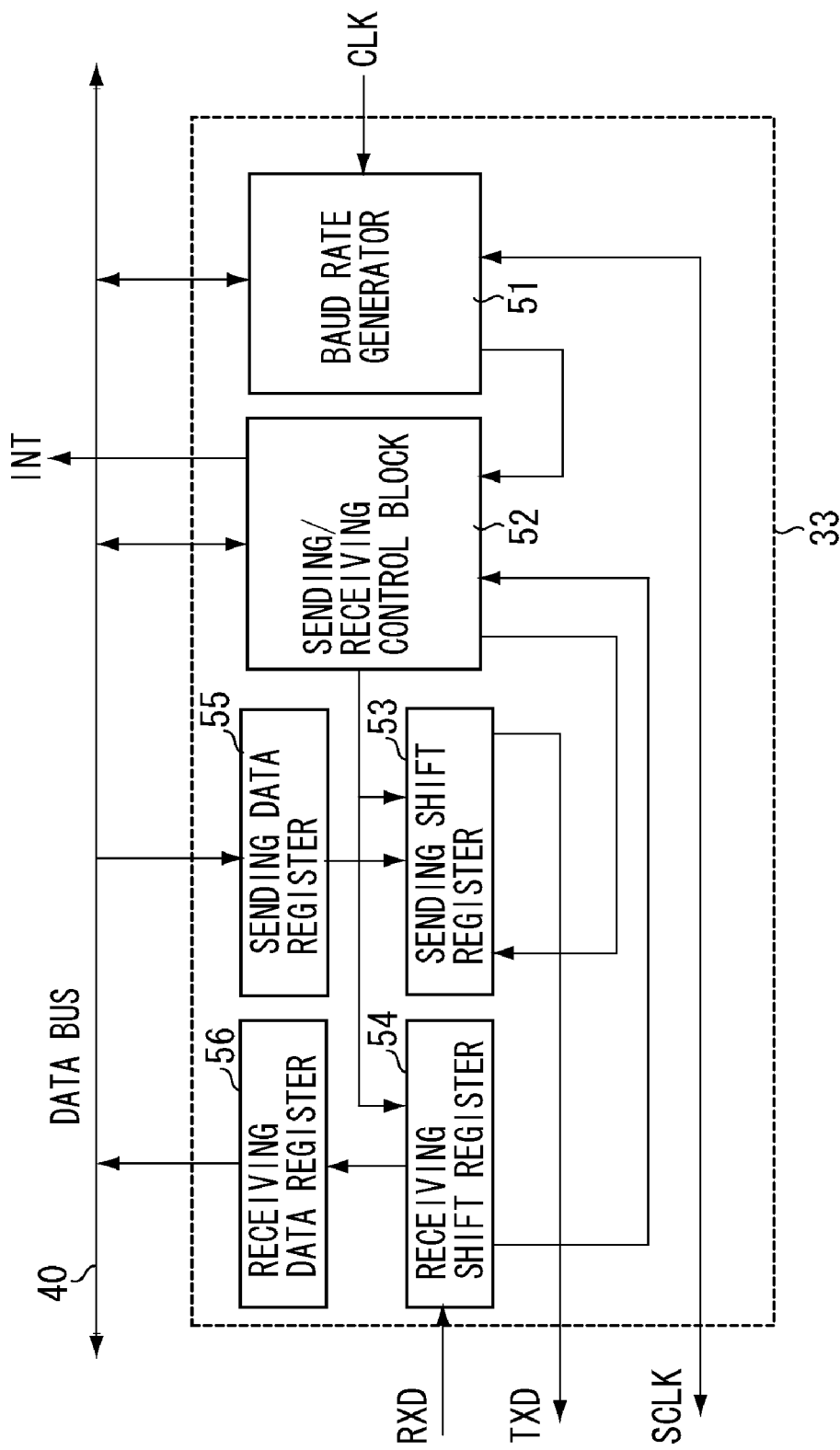
FIG. 3 is a block diagram of a communication control circuit.

FIG. 3 illustrates a configuration of the communication control circuit 33 illustrated in FIG. 2 in more detail. Clock signals of various frequencies generated by the clock generation circuit 32 are input into a baud rate generator 51. The baud rate generator 51 generates the clock signals necessary for communication control based on various communication setting data sent via the data bus 40. Examples of the communication setting data include switching whether the communication is a master or a slave, switching between synchronous communication and asynchronous communication, a synchronous clock frequency setting for synchronous communication, and an asynchronous sampling clock frequency setting for asynchronous communication. If synchronous communication and communication master are set based on the communication setting data, a synchronous clock signal SCLK is output that is based on the synchronous clock frequency setting value for synchronous communication. If synchronous communication and communication slave are set as a first communication mode based on the communication setting data, the synchronous clock signal SCLK is input. The synchronous clock signal SCLK is also supplied to a sending/receiving control block 52. If asynchronous communication is set as a second communication mode based on the communication setting data, a sampling clock based on the asynchronous sampling clock frequency setting for asynchronous communication is supplied to the sending/receiving control block 52. The sending/receiving control block 52 supplies a shift clock to a sending shift register 53 and a receiving shift register 54 and controls the timing of the serial communication by inputting/outputting a send/receive trigger signal, based on the various communication setting data sent via the data bus 40. Further, the sending/receiving control block 52 also generates an interrupt signal when the serial communication sending and receiving is completed.

The sending shift register 53 inputs in parallel the data to be sent by serial communication and outputs in series the input data as a signal TXD. The shift block for serial output is supplied from the sending/receiving control block 52. For asynchronous communication, a sending trigger signal is input from the sending/receiving control block 52. The receiving shift register 54 inputs in series a data signal RXD received by serial communication, and outputs the input data in parallel. The shift block for serial input is supplied from the sending/receiving control block 52. For asynchronous communication, a receiving trigger signal is output to the sending/receiving control block 52. A sending data register 55 is configured so that sending data is input from the data bus 40, and this data is set in the sending shift register 53. A receiving data register 56 is configured so that receiving data is input from the receiving shift register 54, and can be output to the data bus 40.

Figure 4:
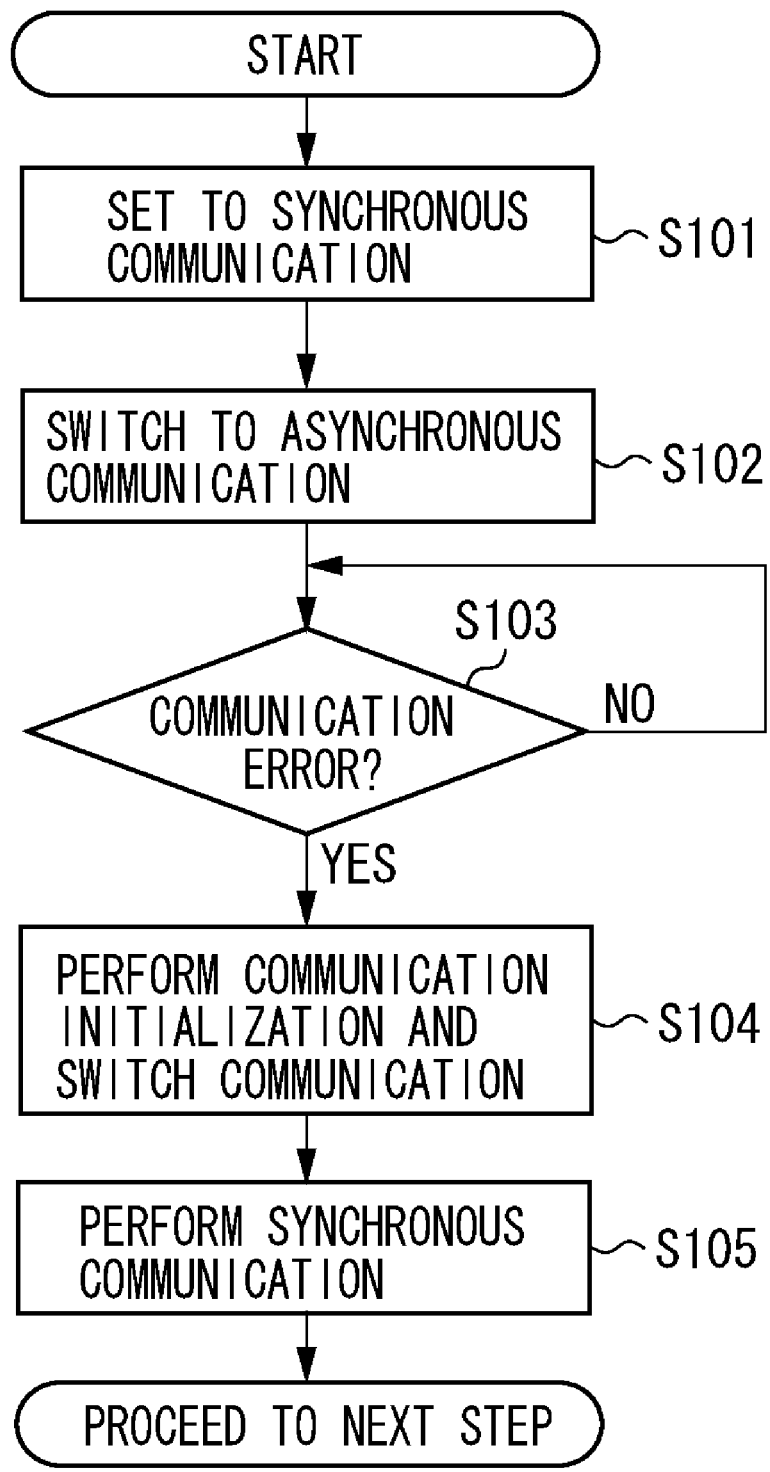
FIG. 4 is a flowchart illustrating a camera system operation performed by the camera and the interchangeable lens according to an exemplary embodiment of the present invention.

FIG. 4 is a flowchart relating to communication initialization based on asynchronous mode communication as a second mode in a camera system composed of the camera 1 and the interchangeable lens 2 according to an exemplary embodiment of the present invention. The respective operations performed by the camera microcomputer 13 and the lens microcomputer 21 will be described below. However, first, the overall operational flow will be described with reference to FIG. 4.

Operation starts with step S101 in the flowchart when a not-illustrated power switch is turned ON so that the camera 1 and the interchangeable lens 2 can operate.

Figure 5:
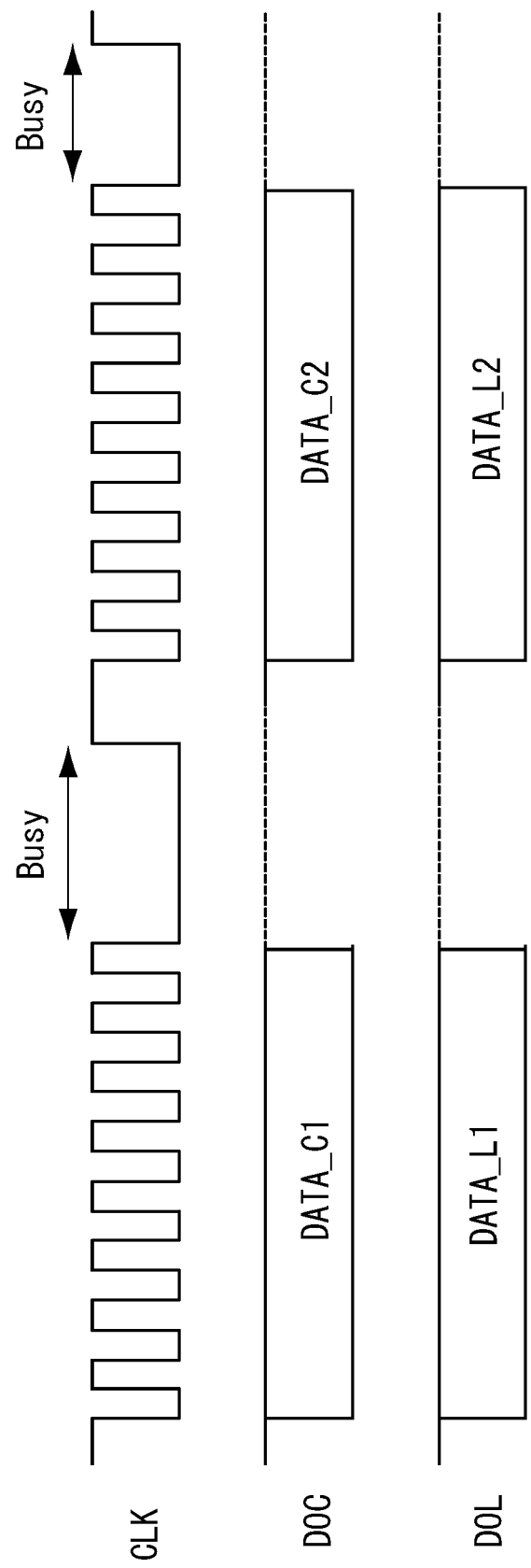
FIG. 5 is a timing chart of communication signals between the camera and the interchangeable lens in a synchronous communication mode.

In step S101, as an initial setting for the communication mode, the camera 1 and the interchangeable lens 2 communicate based on synchronous communication as a first communication mode. FIG. 5 illustrates an example of a synchronous communication mode protocol. In the present exemplary embodiment, the camera is the clock master and, thus, outputs the CLK signal. The camera 1 and the lens 2 input and output data based on an output timing of the CLK signal. The DOC signal is an output signal from the camera 1 to the lens 2 for sending commands DATA_C1 and DATA_C2. The DOL signal is an output signal from the lens 2 to the camera 1 for sending signals DATA_L1 and DATA_L2 as a reply to the command from the camera 1. During the communication of these commands, a busy signal is output indicating that processing is being performed by the slave, specifically, the lens 2.

Subsequently, after it is confirmed that both the camera 1 and the interchangeable lens 2 support asynchronous mode, the mode is switched to asynchronous mode, and communication is performed. In the present exemplary embodiment, the description concerning the switching from synchronous mode to asynchronous mode is omitted.

Figure 6:
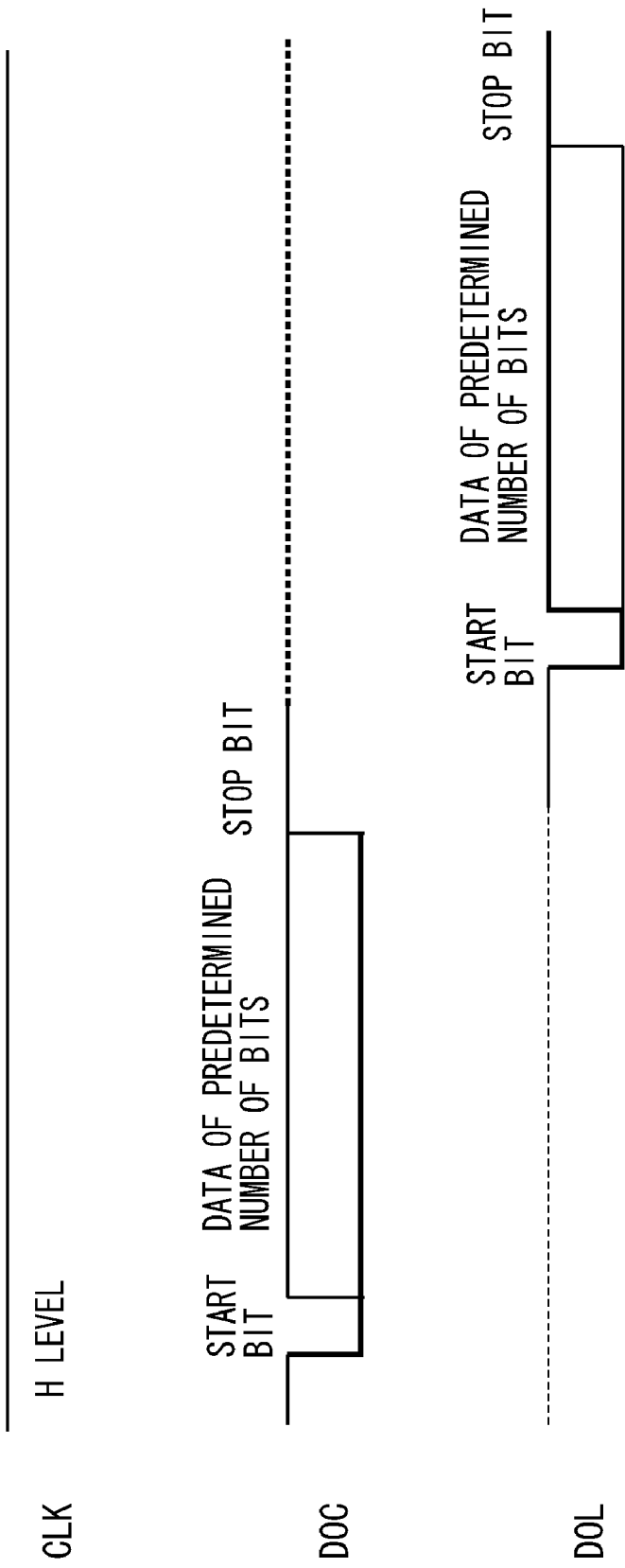
FIG. 6 is a timing chart of communication signals between the camera and the interchangeable lens in an asynchronous communication mode.

In step S102, communication is performed between the camera 1 and the interchangeable lens 2 based on asynchronous mode. FIG. 6 illustrates an example of an asynchronous mode protocol. In asynchronous mode, the CLK signal is not used for communication. Consequently, the camera 1 controls the CLK signal terminal 45 at a fixed H level output. Further, the interchangeable lens 2 sets the CLK signal terminal 45 to input, and permits L edge interrupt. The DOC signal and the DOL signal, which are communication signals used in asynchronous mode, each have a start bit added to the head of the communication data and a stop bit added to the end of the communication data, and are then sent. Unlike synchronous mode, since a busy signal is not generated, asynchronous communication can achieve faster communication.

When performing communication based on asynchronous mode, sometimes the communication cannot be performed normally due to factors such as external noise. An example of such a case is when there is no reply within a predetermined time from the lens 2 side to a command sent by the camera 1 (miscommunication). Further, even if there was a reply within the predetermined time, if the baud rate of the returned data is different to a predetermined value, the camera 1 determines that the data is abnormal. In this case too, communication cannot be performed normally.

The above problem is resolved by the following steps in FIG. 4.

Figure 7:
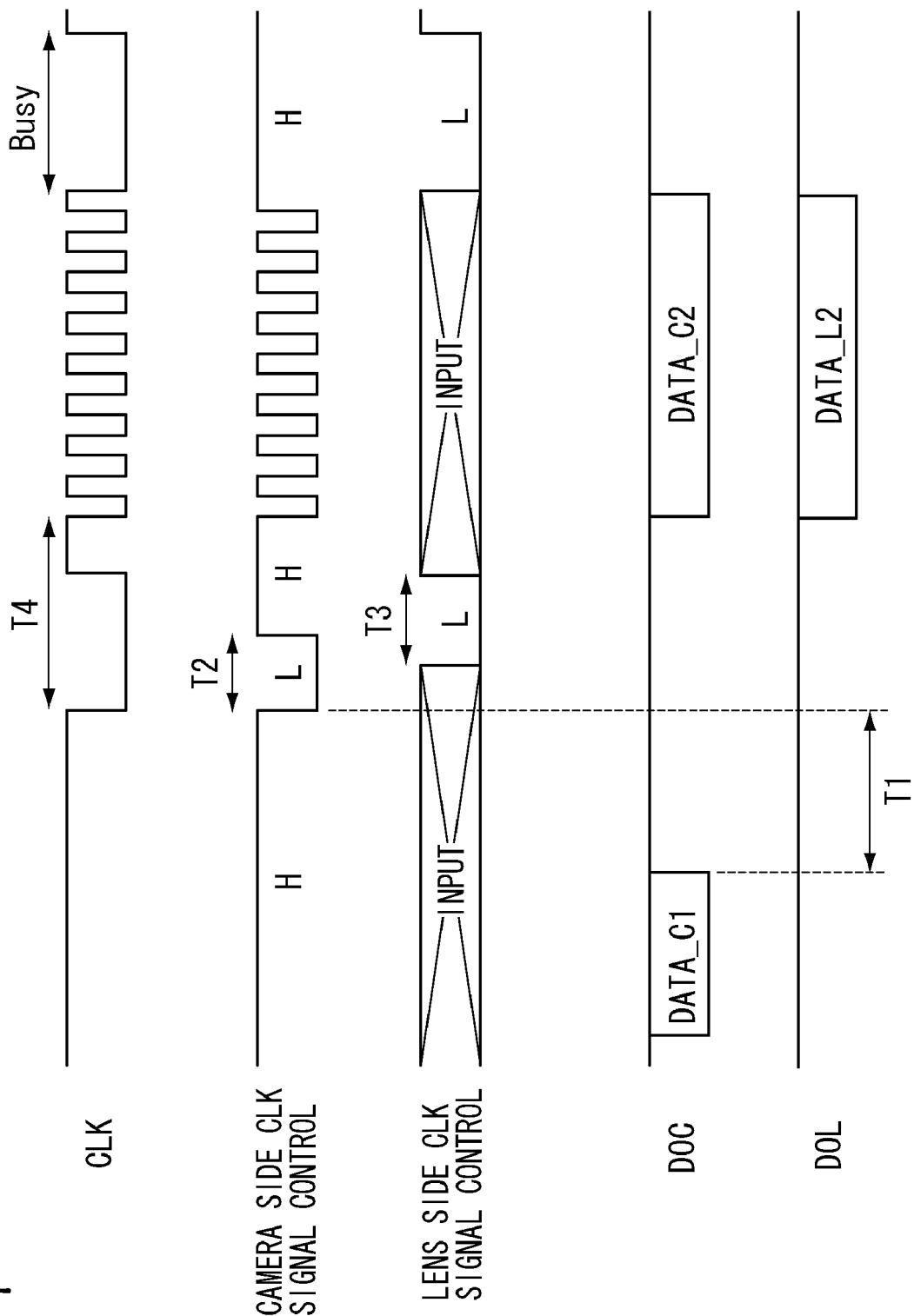
FIG. 7 is a timing chart of communication signals between the camera and the interchangeable lens according to an exemplary embodiment of the present invention.

In step S103, the camera 1 sends the command DATA_C1 to the interchangeable lens 2. The camera 1 then determines whether the communication state is normal by monitoring whether there is a reply within a predetermined time T1 from the interchangeable lens 2. FIG. 7 illustrates the protocol when switching the communication mode from asynchronous mode to synchronous mode. Specifically, the camera 1 determines that a communication error has occurred when there is no reply to the command DATA_C1 even though the predetermined time T1 has elapsed from the sending completion of the command DATA_C1. Further, even if there is a reply from the lens 2 within the predetermined time T1 from the sending completion of the command DATA_C1, if the baud rate is different from the predetermined value, the camera 1 determines that a communication error has occurred. If the camera 1 determines that the communication state is abnormal (YES in step S103), the processing proceeds to step S104.

In step S104, the camera 1 controls the CLK signal terminal 45 to L level output for a period of time T2, and notifies the interchangeable lens 2 of communication initialization. Further, to switch the communication mode from asynchronous mode to synchronous mode, the camera 1 sets the respective signal terminals. At the interchangeable lens 2, an interrupt process occurs due to the input of an L edge into the CLK signal terminal 45, so that the interchangeable lens 2 detects the communication initialization notification. When the interchangeable lens 2 detects the interrupt, the interchangeable lens 2 cancels the interrupt that had been permitted. Then, the interchangeable lens 2 controls the CLK signal terminal 45 to L level output for a period of time T3, and sends a reply to the camera 1 indicating that the communication initialization notification has been received. The camera 1 controls the CLK signal terminal 45 to L level output, then after the time T2 has elapsed, controls the CLK signal terminal 45 to H level output, and confirms the signal level of the CLK signal terminal 45. At this stage, since at the interchangeable lens 2 side the CLK signal terminal 45 is controlled to L level output, the CLK signal is still at L level. The camera 1 can monitor that the switch to synchronous mode has been performed by confirming that the CLK signal terminal 45 is set to L level and the interchangeable lens 2 performs communication initialization processing.

In step S105, the camera 1 sets the CLK signal terminal 45 to L level, then after a time T4 has elapsed, outputs a CLK signal for synchronous communication and a data signal DOC, and restarts communication based on synchronous mode. The lens 2 synchronizes with the input CLK signal, and outputs a data signal DOL.

The lengths of the above-mentioned periods of time T1, T2, T3, and T4 may be determined in advance by the system as values that allow the above-described steps to be executed.

The setting operation flow relating to communication initialization of a camera system configured from the camera 1 and the interchangeable lens 2 is described above.

Next, the operation flow of the camera microcomputer 13 relating to communication initialization based on asynchronous mode communication with the interchangeable lens 2 will be described with reference to the flowchart illustrated in FIG. 8.

Figure 8:
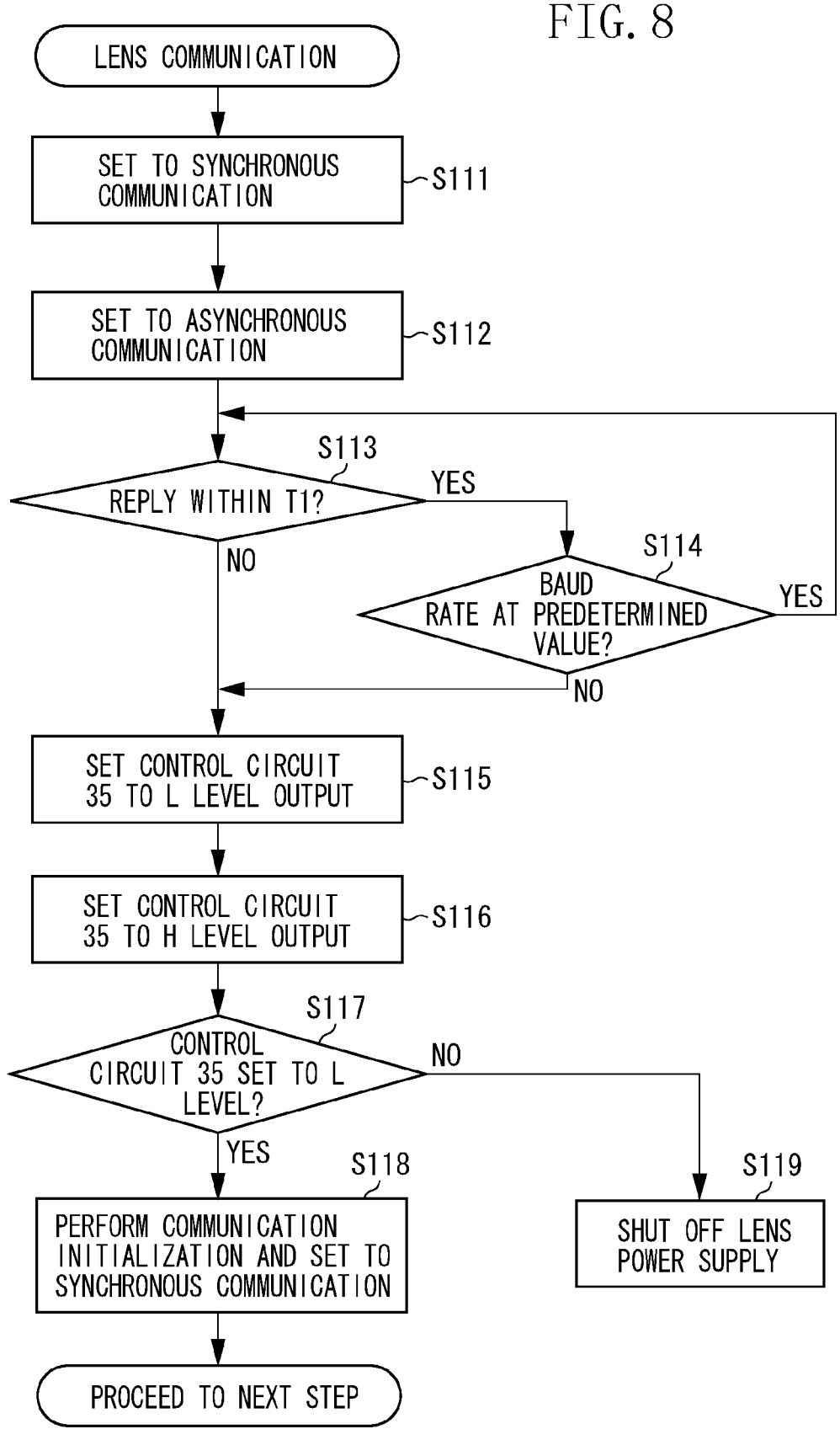
FIG. 8 is an operation flowchart of a camera microcomputer according to an exemplary embodiment of the present invention.

When a not-illustrated power switch is turned ON so that the camera microcomputer 13 starts operation and communicates with the interchangeable lens 2, the operation flow from step S111 of FIG. 8 is executed.

In step S111, as described in step S101 for the operation flow of the camera system illustrated in FIG. 4, first the camera microcomputer 13 sets the communication control circuit 33 and the IO control circuits 35 to 37 so that communication is performed based on synchronous mode. Subsequently, after it is confirmed that both the camera microcomputer 13 and the lens microcomputer 21 support asynchronous mode, the camera microcomputer 13 switches the setting to asynchronous mode.

In step S112, the camera microcomputer 13 sets the communication control circuit 33 and the IO control circuits 35 to 37 so that asynchronous communication is performed. The camera microcomputer 13 controls the CLK signal IO control circuit 35 connected to the CLK signal terminal 45, which is not used in asynchronous communication mode, to a fixed H level output.

In step S113, the camera microcomputer 13 sets the command DATA_C1 to be sent to the interchangeable lens 2 in the sending shift register 53, and sends the command from the TXD signal IO control circuit 36 to the interchangeable lens 2 via the TXD signal terminal 46. The camera microcomputer 13 measures the time from the completion of the sending of the command DATA_C1 to the returned data from the interchangeable lens 2 returning to the RXD signal IO control circuit 37 via the RXD signal terminal 47 with the counter/timer circuit 34. At this point, if there is no reply even though the predetermined period of time T1 has elapsed, the camera microcomputer 13 determines that a communication error has occurred. If the camera microcomputer 13 determines that a communication error has occurred (NO in step S113), the processing proceeds to step S115. On the other hand, if there is a reply within the predetermined period of time T1 (YES in step S113), the processing proceeds to step S114.

In step S114, the camera microcomputer 13 determines whether the baud rate of the returned data from the interchangeable lens 2 is at a predetermined value. If the baud rate is at a value different from the predetermined value (NO in step S114), the camera microcomputer 13 determines that the returned data is abnormal data, and the processing proceeds to step S115.

In step S115, the camera microcomputer 13 sets the CLK signal IO control circuit 35 to L level output control, resets the counter/timer circuit 34, and then restarts the processing.

In step S116, after the time measured by the counter/timer circuit 34 passes the predetermined period of time T2, the camera microcomputer 13 sets the CLK signal IO control circuit 35 to H level output control.

In step S117, the camera microcomputer 13 confirms the signal level of the CLK signal IO control circuit 35. If the confirmed level is L level (YES in step S117), the camera microcomputer 13 determines that the interchangeable lens 2 is performing communication initialization processing, and the processing proceeds to step S118.

On the other hand, if the level is confirmed to be H level (NO in step S117), since this means that the interchangeable lens 2 has not been able to detect a communication initialization notification, a hardware problem may have occurred. Thus, in step S119, the camera microcomputer 13 controls the power generation unit 12 and shuts off the power supply to the interchangeable lens 2.

If the confirmed level is L level (YES in step S117), then in step S118, the camera microcomputer 13 switches the setting of the communication control circuit 33 and the IO control circuits 35 to 37 to a synchronous signal. Further, after the time measured by the counter/timer circuit 34 passes the predetermined period of time T4, the camera microcomputer 13 restarts communication based on synchronous mode.

The operation flow performed by the camera microcomputer 13 relating to communication initialization based on asynchronous mode communication with the interchangeable lens 2 is described above.

Next, the operation flow relating to communication initialization with the camera performed by the lens microcomputer 21 will be described with reference to the flowchart illustrated in FIG. 9.

Figure 9:
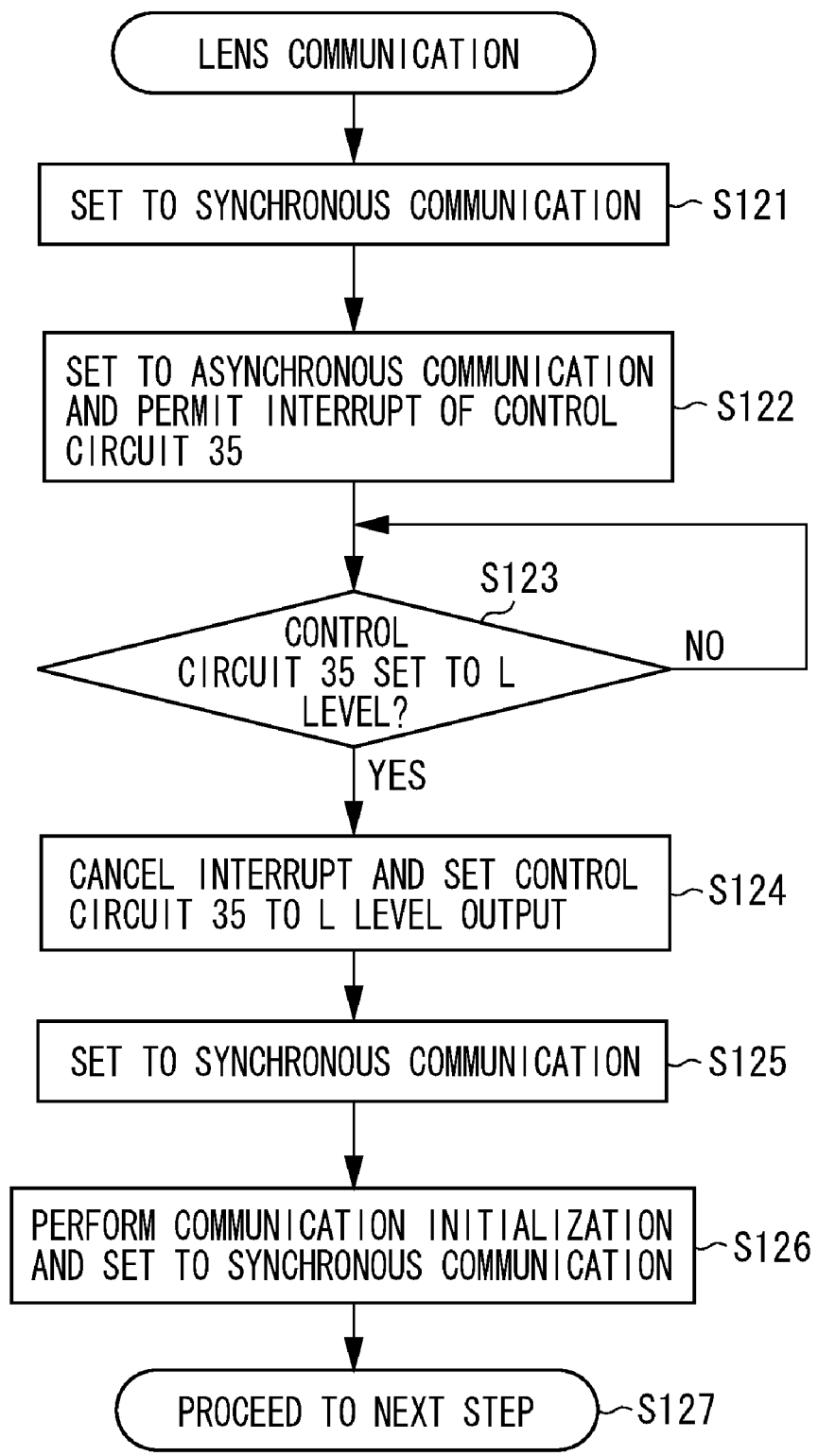
FIG. 9 is an operation flowchart of a lens microcomputer according to an exemplary embodiment of the present invention.

When the interchangeable lens 2 is mounted on the camera 1 and receives power supply so that the lens microcomputer 21 can operate, the operation flow starting with step S121 of FIG. 9 is executed.

In step S121, as described in step S101 for the operation flow of the camera system illustrated in FIG. 4, first the lens microcomputer 21 sets the communication control circuit 33 and the IO control circuits 35 to 37 so that communication is performed based on synchronous mode. Subsequently, after it is confirmed that both the camera microcomputer 13 and the lens microcomputer 21 support asynchronous communication mode, the lens microcomputer 21 switches the setting to asynchronous mode.

In step S122, the lens microcomputer 21 sets the communication control circuit 33 and the IO control circuits 35 to 37 so that asynchronous communication is performed. Further, the lens microcomputer 21 sets the CLK signal IO control circuit 35 connected to the CLK signal terminal 45, which is not used in asynchronous communication mode, to input, so that an interrupt by the L edge signal is permitted.

In step S123, when the L edge signal is input into the CLK signal IO control circuit 35 during asynchronous communication, the interrupt control circuit 38 generates an interrupt notification. The lens microcomputer 21 receives the generated interrupt notification, and determines that it is a lens initialization notification from the camera 1.

In step S124, the lens microcomputer 21, which has determined in step S123 that the control circuit 35 is set to L level (YES in step S123), performs communication initialization processing, and starts measuring time with the counter/timer circuit 34. Further, the lens microcomputer 21 cancels the Ledge interrupt setting of the CLK signal IO control circuit 35, and sets to L level output control during the predetermined time T3. By setting the CLK signal IO control circuit 35 to L level output, the camera 1 is notified that communication initialization processing is being performed on the interchangeable lens 2.

In step S125, the lens microcomputer 21 sets the communication control circuit 33 and the IO control circuits 35 to 37 so that synchronous communication is performed. After the predetermined period of time T3 has elapsed since the CLK signal IO control circuit 35 has been set to L level output, the CLK signal IO control circuit 35 is set to input, so that it is in a synchronous communication clock input receiving state. This predetermined period of time T3 needs to be set so that the interchangeable lens 2 can complete the communication initialization processing and the synchronous communication setting within that time.

In step S126, synchronous communication is performed based on the synchronous signals output from the camera 1.

The operation flow relating to communication initialization with the camera 1 performed by the lens microcomputer 21 is described above.

If a communication error like that described above occurs during a recording operation, rather than performing initialization processing immediately after the communication error has been determined to have occurred, the processing proceeds to initialization after the recording operation is completed.

In the above-described exemplary embodiment, although the communication mode is switched from asynchronous mode to synchronous mode after communication initialization, the exemplary embodiment according to the present invention is not limited to this. The communication mode after communication initialization does not have to be limited to synchronous mode as described above, and asynchronous mode may be restarted. In such a case, the communication clock frequency may be changed to that before communication initialization. Further, communication can be attempted at the same clock frequency as before communication initialization, and if the communication error is not resolved, the communication clock frequency can changed to another clock frequency.

Thus, according to the present exemplary embodiment, the problem that a communication error can occur when performing asynchronous communication can be resolved, thus enabling communication to be reliably performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-131249 filed Jun. 8, 2010, which is hereby incorporated by reference herein in its entirety.

What is claimed is:

1. An imaging apparatus capable of mounting an interchangeable lens thereon, the imaging apparatus comprising:

first and second terminals for communicating with the interchangeable lens; and a control unit capable of switching between a first communication mode in which a clock signal is output from the first terminal and communication is performed using the second terminal based on the clock signal and a second communication mode in which communication is performed using the second terminal without outputting the clock signal from the first terminal, wherein the control unit is configured to output a predetermined signal to the interchangeable lens via the first terminal when communication from the interchangeable lens does not satisfy a predetermined condition in the second communication mode, wherein when the second communication mode fails, the predetermined signal from the first terminal is output to switch the imaging apparatus from the second communication mode to the first communication mode.

2. The imaging apparatus according to claim 1, further comprising a mount, wherein the first terminal and the second terminal are provided on the mount.

3. The imaging apparatus according to claim 1, wherein the predetermined condition includes a required time until data returns from the interchangeable lens after data is sent from the control unit to the interchangeable lens.

4. The imaging apparatus according to claim 1, wherein the predetermined condition includes a communication speed of the interchangeable lens.

5. The imaging apparatus according to claim 1, wherein the control unit is configured to switch to the first communication mode after outputting the predetermined signal.

6. An interchangeable lens mountable on an imaging apparatus, the interchangeable lens comprising:
> first and second lens terminals for communicating with the imaging apparatus; and
> a lens control unit capable of switching between a first communication mode in which a clock signal is received from the first lens terminal and communication is performed using the second lens terminal based on the clock signal and a second communication mode in which communication is performed using the second lens terminal without receiving the clock signal from the first lens terminal,
> wherein the lens control unit is capable of detecting a predetermined signal sent from the imaging apparatus via the first lens terminal when communication from the lens control unit does not satisfy a predetermined condition in the second communication mode,
> wherein when the second communication mode fails, the predetermined signal from the imaging apparatus is input to switch the interchangeable lens from the second communication mode to the first communication mode via the first lens terminal.

7. The interchangeable lens according to claim 6, further comprising a lens mount,
> wherein the first lens terminal and the second lens terminal are provided on the lens mount.

8. The interchangeable lens according to claim 6, wherein the lens control unit initializes communication when detecting the predetermined signal.

9. The interchangeable lens according to claim 6, wherein the predetermined condition includes a required time until data is returned to the imaging apparatus after data is received from the imaging apparatus.

10. The interchangeable lens according to claim 6, wherein the predetermined condition includes a communication speed of the interchangeable lens.

11. The interchangeable lens according to claim 6, wherein the lens control unit is configured to switch to the first communication mode after detecting the predetermined signal.

12. An imaging system comprising:
> an imaging apparatus and an interchangeable lens mountable on the imaging apparatus,
> wherein the imaging apparatus includes first and second terminals for communicating with the interchangeable lens,
> wherein the imaging apparatus includes a control unit capable of switching between a first communication mode in which a clock signal is output from the first terminal and communication is performed using the second terminal based on the clock signal and a second communication mode in which communication is performed using the second terminal without outputting the clock signal from the first terminal,
> wherein the interchangeable lens includes first and second lens terminals for communicating with the imaging apparatus,
> wherein the interchangeable lens includes a lens control unit capable of switching between a first communication mode in which a clock signal is received from the first lens terminal and communication is performed using the second lens terminal based on the received clock signal and a second communication mode in which communication is performed using the second lens terminal without receiving the clock signal from the first lens terminal,
> wherein the control unit is configured to output a predetermined signal to the lens control unit via the first terminal when communication from the lens control unit does not satisfy a predetermined condition in the second communication mode, and the lens control unit is capable of detecting the predetermined signal sent from the control unit via the first lens terminal,
> wherein when the second communication mode fails, the predetermined signal from the first terminal is output to switch the interchangeable lens from the second communication mode to the first communication mode.

* * * * *